(12) United States Patent
Tsuritani

(10) Patent No.: US 12,228,845 B2
(45) Date of Patent: Feb. 18, 2025

(54) ARTICLE ATTACHING DEVICE AND MEASURING SYSTEM

(71) Applicant: Shoh Tsuritani, Tokyo (JP)

(72) Inventor: Shoh Tsuritani, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 201 days.

(21) Appl. No.: 17/926,142

(22) PCT Filed: Jul. 16, 2021

(86) PCT No.: PCT/IB2021/056426
§ 371 (c)(1),
(2) Date: Nov. 18, 2022

(87) PCT Pub. No.: WO2022/023860
PCT Pub. Date: Feb. 3, 2022

(65) Prior Publication Data
US 2023/0185172 A1 Jun. 15, 2023

(30) Foreign Application Priority Data

Jul. 31, 2020 (JP) ................................. 2020-131154
Jul. 6, 2021 (JP) .................................. 2021-112323

(51) Int. Cl.
*G03B 17/56* (2021.01)
*F16M 11/10* (2006.01)
*G03B 17/02* (2021.01)

(52) U.S. Cl.
CPC ........... *G03B 17/561* (2013.01); *F16M 11/10* (2013.01); *G03B 17/02* (2013.01)

(58) Field of Classification Search
CPC ....... G03B 17/561; B60R 9/048; B60R 11/04; F16M 11/10
USPC ........................................................ 248/274.1
See application file for complete search history.

(56) References Cited

U.S. PATENT DOCUMENTS

| | | | |
|---|---|---|---|
| 6,040,853 A * | 3/2000 | Delagnes | G01N 21/8903 73/104 |
| 8,150,248 B1 | 4/2012 | Woodman | |
| 9,402,016 B1 | 7/2016 | Hidalgo | |
| 2017/0152990 A1 | 6/2017 | Kielland | |
| 2018/0037172 A1 * | 2/2018 | Nelson | F16M 11/2092 |
| 2019/0302577 A1 | 10/2019 | Elias | |
| 2020/0156559 A1 * | 5/2020 | Shiratsuki | F16M 13/022 |
| 2020/0274223 A1 * | 8/2020 | Jang | F16M 11/10 |

FOREIGN PATENT DOCUMENTS

JP 2018-154325 10/2018

OTHER PUBLICATIONS

International Search Report issued on Oct. 29, 2021 in PCT/IB2021/056426 filed on Jul. 16, 2021.

* cited by examiner

*Primary Examiner* — Christopher Garft
(74) *Attorney, Agent, or Firm* — XSENSUS LLP

(57) ABSTRACT

An article attaching device to be attached to an apparatus including a movable member includes a holder configured to hold an article, a base to be secured to the apparatus, and a rotator to support the holder on the base. The rotator supports the holder to rotate in conjunction with a movement of the movable member.

12 Claims, 11 Drawing Sheets

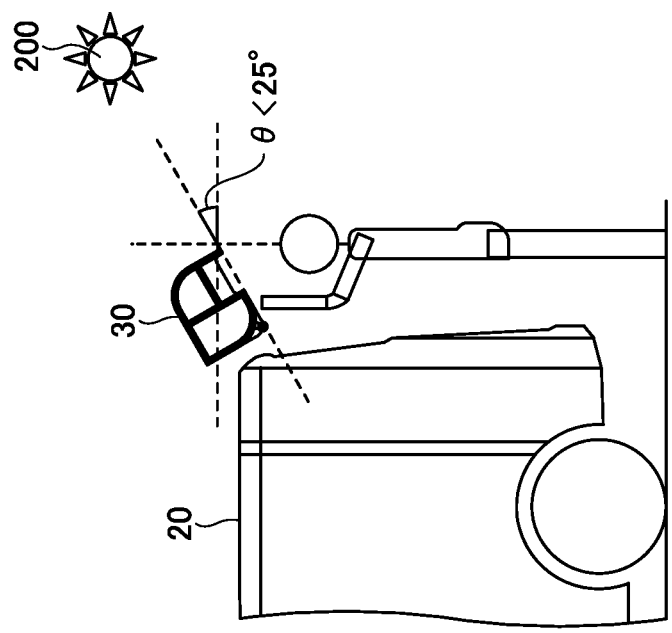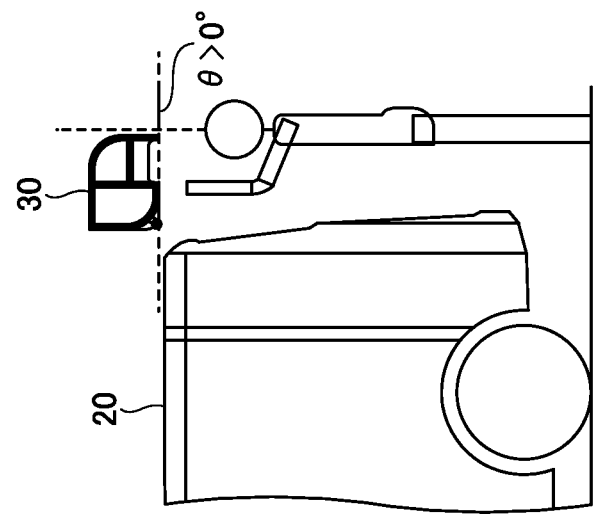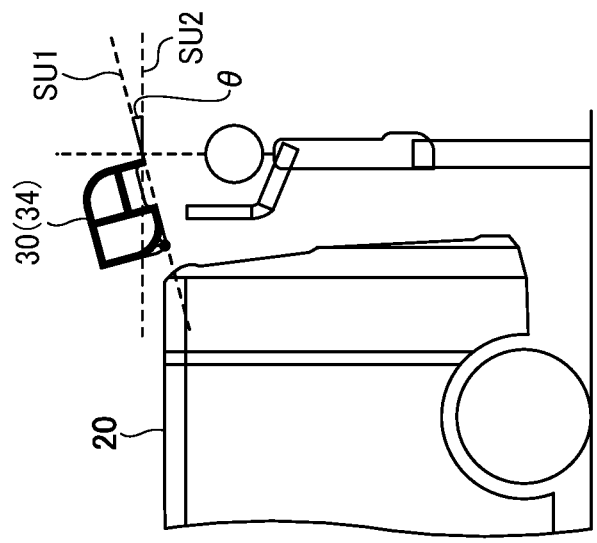

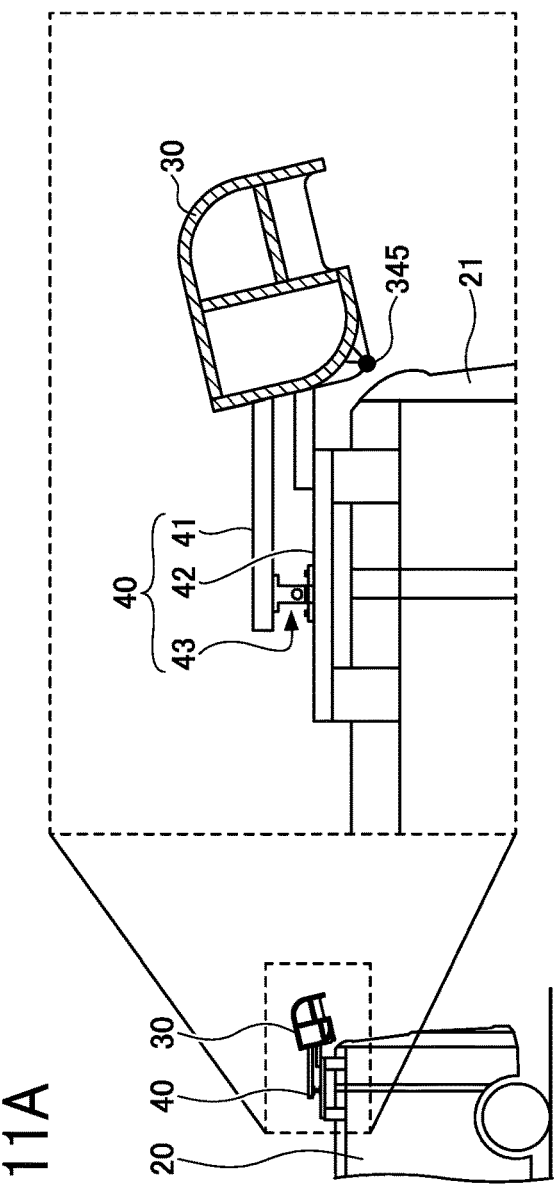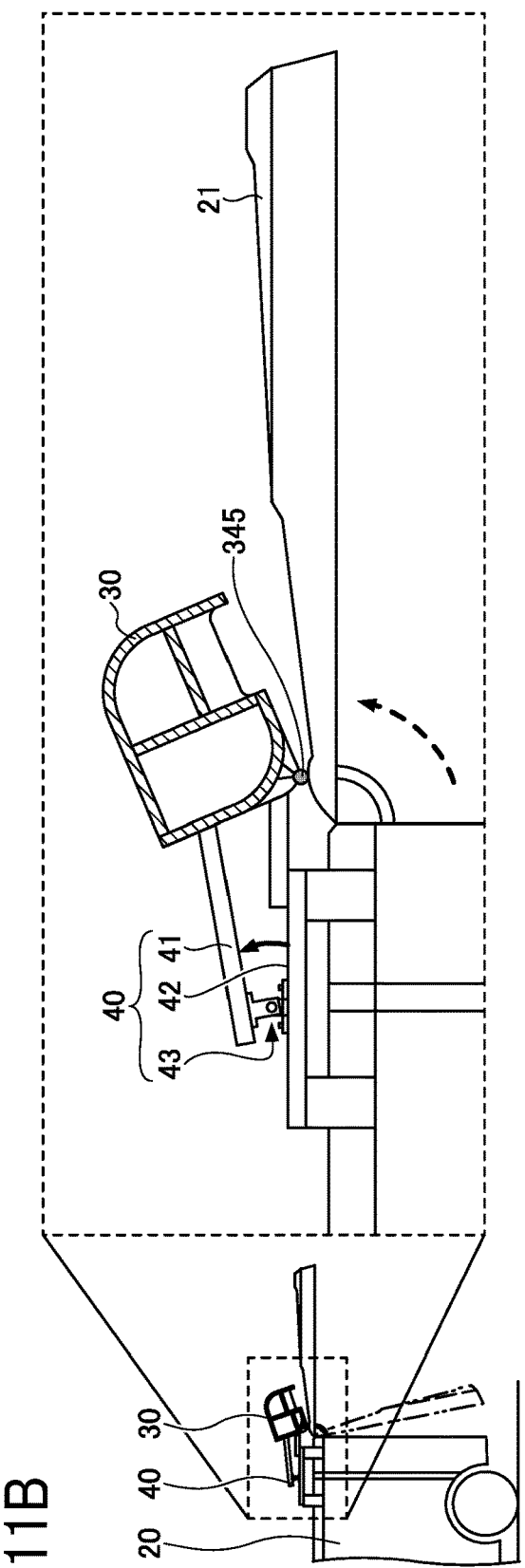
FIG. 11A
FIG. 11B

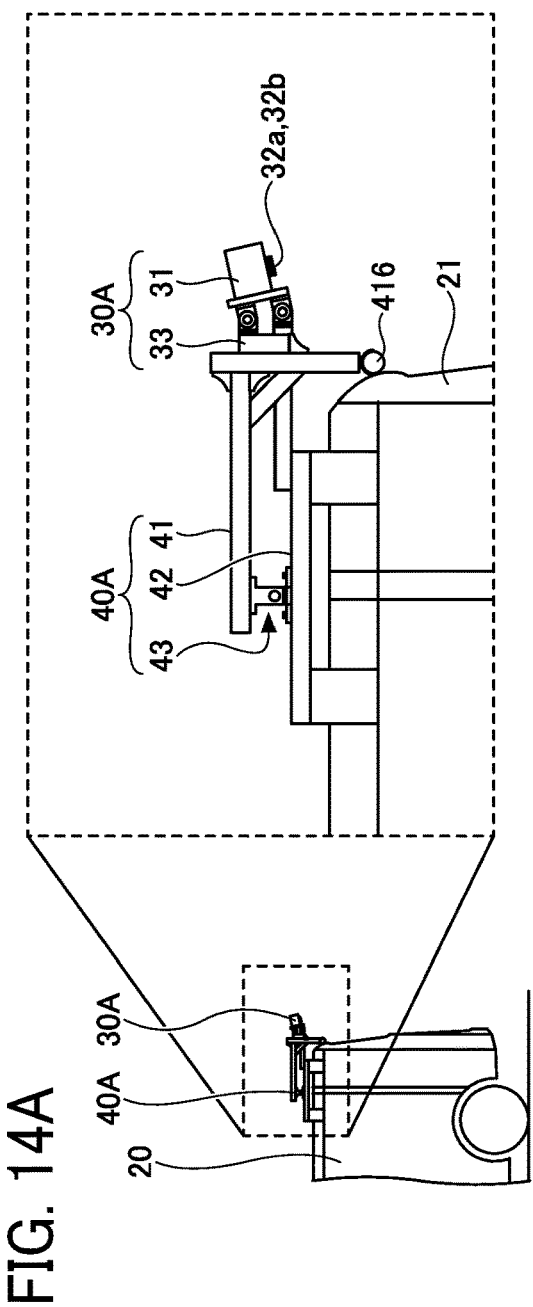
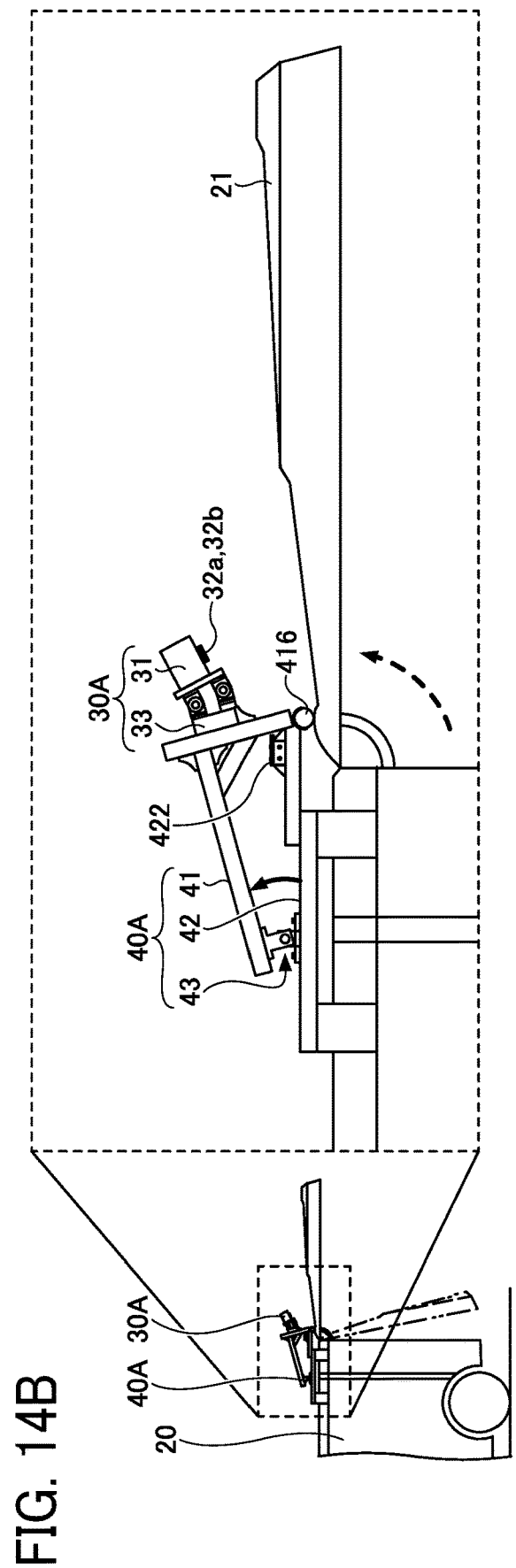

ARTICLE ATTACHING DEVICE AND MEASURING SYSTEM

CROSS-REFERENCE TO RELATED APPLICATIONS

The present application is based on PCT filing PCT/IB2021/056426, filed Jul. 16, 2021, which claims priority to Japanese Application No. 2020-131154, filed Jul. 31, 2020 and 2021-112323 filed Jul. 6, 2021, the entire contents of each are incorporated herein by reference.

TECHNICAL FIELD

Embodiments of the present disclosure relate to an article attaching device and a measuring system.

BACKGROUND ART

There are measuring systems that include an imaging device such as a camera to be attached to a movable apparatus, such as a vehicle and a drone. Such a measuring system can measure conditions of an external environment (such as vehicles around the imaging device, road conditions, and tunnel conditions). For the measurement of the conditions of the external environment, there are known imaging devices such as wide-angle lens cameras, stereo cameras including a plurality of cameras, and laser imaging detection and ranging (LIDAR) devices.

PTL 1 discloses an article attaching device for attaching a stereo camera to a vehicle.

CITATION LIST

Patent Literature

PTL 1

Japanese Unexamined Patent Publication No. 2018-154325

SUMMARY OF INVENTION

Technical Problem

A movable apparatus such as a vehicle includes a movable member, such as a rear hatch door. In the structure disclosed in PTL 1, the article attaching device is mounted to the rear hatch door of the vehicle. There is a risk that the article attaching device may hinder opening and closing operation of the rear hatch door. There is a demand for improving convenience in operating the movable member in the movable body to which the article attaching device is mounted.

Solution to Problem

In view of the foregoing, an object of the present disclosure is to improve convenience in an article attaching device to be attached to an apparatus including a movable member, and an apparatus including the article attaching device.

Advantageously, the article attaching device includes a holder to hold an article, a base to be secured to the apparatus including the movable member, and a rotator to support the holder on the base. The rotator supports the holder to rotate in conjunction with a movement of the movable member.

Advantageous Effects of Invention

Accordingly, the article attaching device and the measuring system with improved convenience are provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 8A is a view illustrating a mounting angle of the protective cover of the measuring device according to the first embodiment.

FIG. 8B is another view illustrating the mounting angle of the protective cover illustrated in FIG. 8A.

FIG. 8C is another view illustrating the mounting angle of the protective cover illustrated in FIG. 8A.

FIG. 11A is a view illustrating an operation of the article attaching device according to the first embodiment.

FIG. 11B is another view illustrating the operation of the article attaching device according to the first embodiment.

FIG. 14A is a view illustrating an operation of an article attaching device according to a second embodiment.

FIG. 14B is another view illustrating the operation of the article attaching device according to the second embodiment.

DESCRIPTION OF EMBODIMENTS

Figure 1:
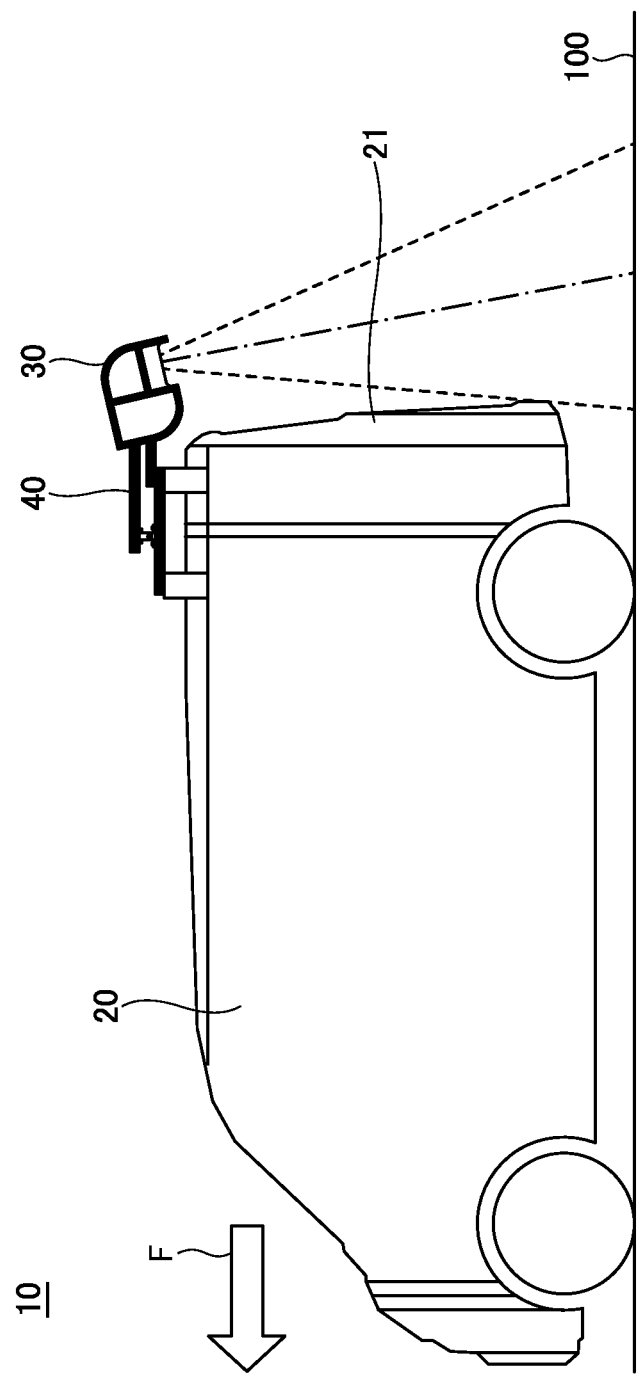
FIG. 1 is a side view of a measuring system according to a first embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Below, embodiments of the present disclosure are described with reference to accompanying drawings. Note that identical components are given identical reference numerals, and redundant descriptions are omitted.

With reference to FIGS. 1 to 4, a description is given of a measuring system 10 according to a first embodiment of the present disclosure.

FIG. 1 is a side view of the measuring system 10 according to the present embodiment. The measuring system 10 includes a vehicle 20 and a measuring device 30 mounted to the vehicle 20. In the following description, the direction of travel of a vehicle 20 is referred to as the forward direction, the direction opposite to the direction of travel is referred to as the backward direction, the direction of gravity is referred to as the downward direction, and the direction opposite to the direction of gravity is referred to as the upward direction. The lateral direction to the right in the direction of travel of the vehicle 20 is referred to as the right direction, and the direction opposite to the right direction is referred to as the left direction. The traveling direction of the vehicle 20 is indicated by outlined arrow F in FIG. 1. The alternate long and short dashed lines in the drawings indicate the image capture direction of the measuring device 30. The broken line in the drawing indicates the image capture range of the measuring device 30.

The measuring system 10 measures the state of a road surface 100 (target) while traveling on the road surface 100. The measuring system 10 includes the vehicle 20 (movable body), the measuring device 30 attached to the vehicle 20, and an article attaching device 40.

The vehicle 20 (an example of an apparatus including movable member) can travel (move) on the road surface 100. The article attaching device 40 is disposed on an upper face (first face) of the vehicle 20. The vehicle 20 includes a rear hatch door 21 (movable member) on a rear face (second face) different from the upper face of the vehicle 20. The rear hatch door 21 can be opened and closed in a direction. In other words, rear hatch door 21 rotates (swings) in an open-close direction. For example, the open-close direction is parallel to the direction of travel of the vehicle 20 indicated by arrow F.

The article attaching device 40 disposed on the upper face of the vehicle 20 projects beyond the rear end of the upper face. The measuring device 30 is attached to the article attaching device 40 such that the image capture direction is substantially downward. The measuring device 30 is inside a movable range of the rear hatch door 21 at the time of measurement.

With such a configuration, while the measuring system 10 moves forward (the direction indicated by arrow F), a stereo camera 31 (illustrated in FIG. 2) inside the measuring device 30 captures an image of the road surface 100 (target of measurement). Thus, the measuring system 10 can measure the unevenness of the road surface 100 and the conditions (whether the white line has been disappeared) of the road surface 100. More specifically, the measuring system 10 can measure a road surface property value such as the flatness (the unevenness of the road surface in the direction of travel), rutting depth, and crack ratio of the road. Based on the three types of road surface property values, a maintenance control index (MCI) is obtained. After the measurement, the measurement data may be transmitted to an external device, such as a personal computer (PC) and a tablet terminal so as to obtain the MCI. Alternatively, a PC may be mounted on the vehicle 20 so as to obtain the MCI during the measurement while the vehicle 20 moves.

Figure 2:
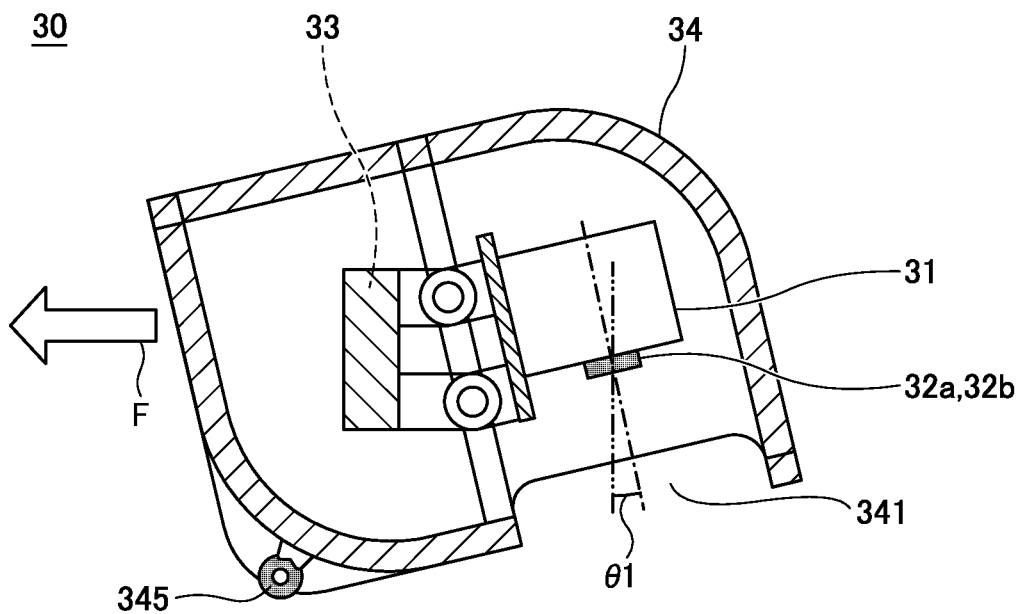
FIG. 2 is a cross-sectional view of the measuring device illustrated in FIG. 1, as viewed from a side.
Figure 3:
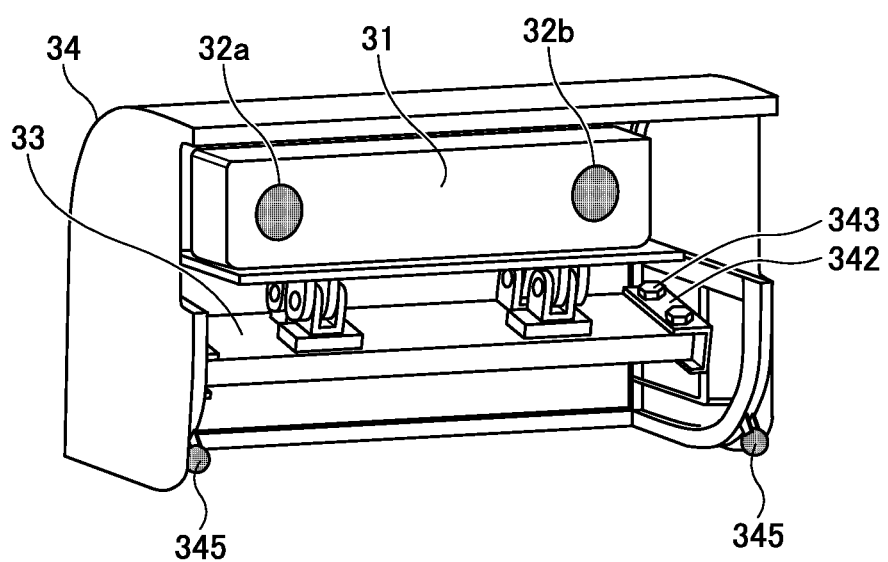
FIG. 3 is a perspective view of the measuring device illustrated in FIG. 2, as viewed from the bottom.

Next, the measuring device 30 will be further described. FIG. 2 is a cross-sectional view of the measuring device 30 as viewed from a side. FIG. 3 is a perspective view of the measuring device 30 as viewed from the bottom.

The measuring device 30 includes the stereo camera 31 (a measurement device or imaging device) having lenses 32a and 32b, a camera mount 33 (a measuring device mount) that secures the stereo camera 31, and a protective cover 34 that covers the stereo camera 31. The protective cover 34 includes a contact part 345 described later and an opening 341.

The stereo camera 31 including the two lenses 32a and 32b can measure the distance to the measurement target by processing acquired image data. Note that the stereo camera 31 is an example of the imaging device of the measuring device 30, and the imaging device is not limited thereto. For example, the imaging device may be a camera having a monocular lens to check the state of a subject. Further, the measuring device 30 may include not a single imaging device but two or more imaging devices. With a plurality of imaging devices, the measuring device 30 can acquire a wider range of measurement data. Further, each of the lens 32a and 32b of the stereo camera 31 may be a wide-angle lens with a focal length of 35 millimeters or less, so as to acquire a wider range of measurement data. The measuring device 30 may include a LIDAR device as an imaging device.

The stereo camera 31 is attached to the article attaching device 40 (see FIG. 1) via the camera mount 33 (the measuring device mount). Note that the camera mount 33 may have a function to adjust an angle.

As illustrated in FIG. 2, the image capture direction (indicated by an alternate long and short dashed line) of the stereo camera 31 of the measuring device 30 has a predetermined angle with respect to the traveling direction (indicated by arrow F) of the vehicle 20 illustrated in FIG. 1. In other words, when the measuring device 30 is viewed in the width direction (from a lateral side), the image capture direction of the stereo camera 31 indicated by the alternate long and short dashed line is inclined by an angle θ1 toward the opposite direction (rearward) to the traveling direction of the vehicle 20 with respect to the vertical direction indicated by the chain double-dashed line in FIG. 2.

The protective cover 34 includes, for example, a resin plate and an aluminum frame supporting the resin plate. The protective cover 34 is shaped like a box having an opening on the bottom side (that is, the image-capturing side) of the imaging device (e.g., the stereo camera 31). The stereo camera 31 is disposed in the internal space of the protective cover 34. The protective cover 34 prevents light from a light source 200 (see FIG. 8) from directly entering the lenses 32*a* and 32*b*. The protective cover 34 protects the stereo camera 31 from, for example, rain and wind. Inside the protective cover 34, a bracket 342 is secured to the camera mount 33 with a fastening member 343.

Figure 4:
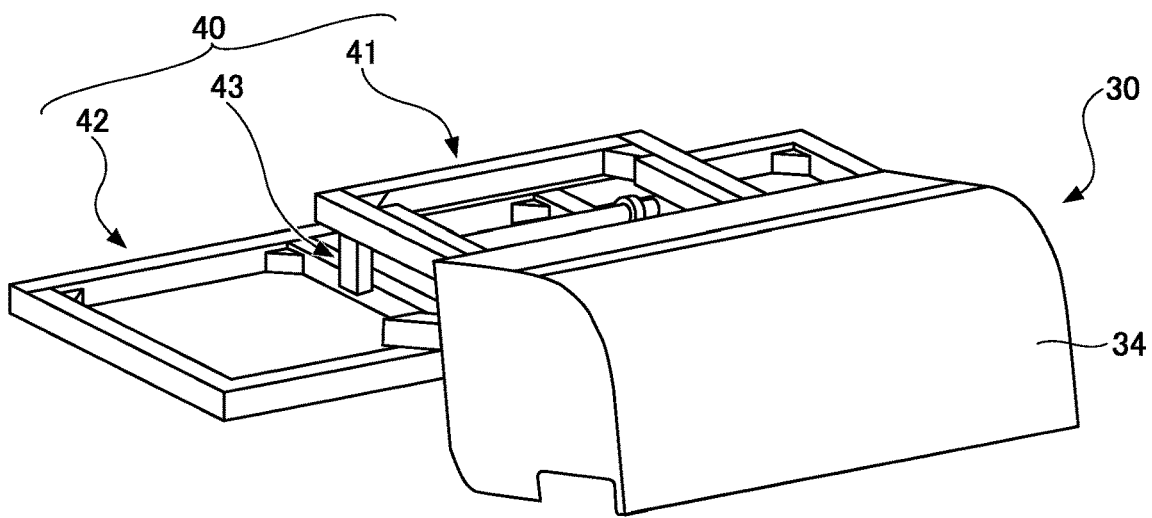
FIG. 4 is a perspective view of the measuring device and an article attaching device illustrated in FIG. 1.
Figure 5:
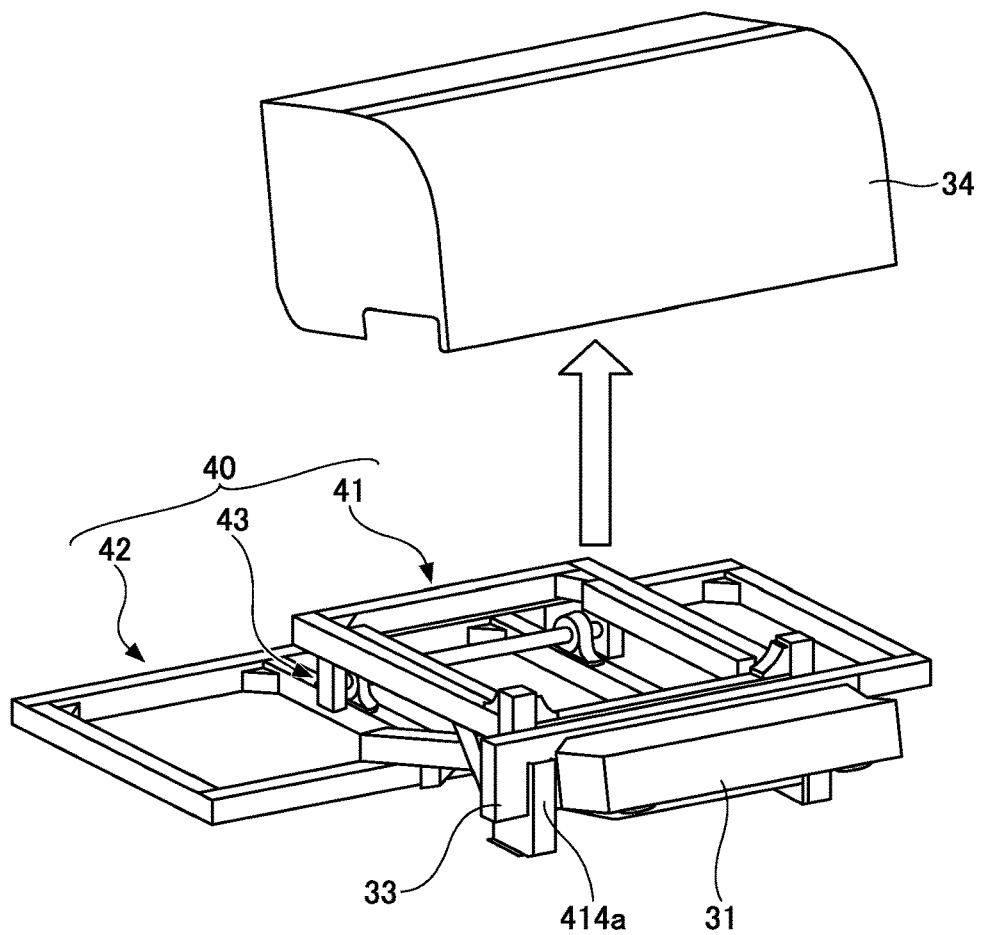
FIG. 5 is a perspective view of the measuring device and the article attaching device illustrated in FIG. 4 in a state in which a protective cover is removed from the measuring device.
Figure 6:
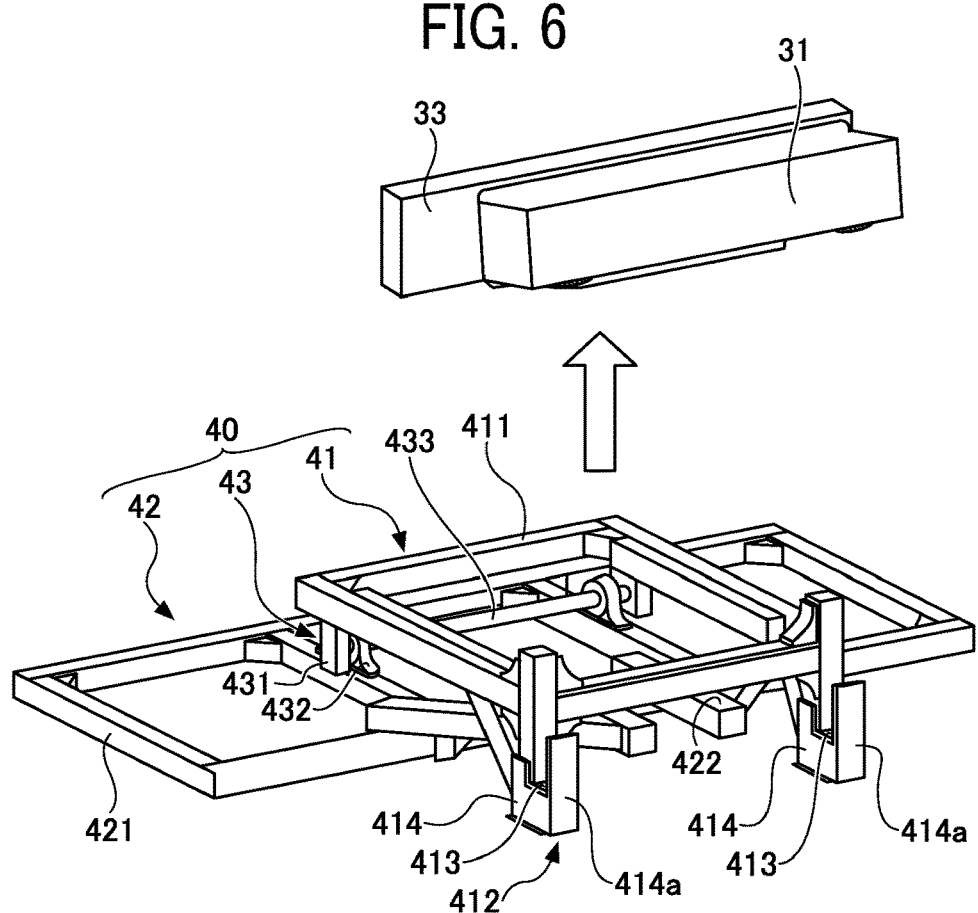
FIG. 6 is a perspective view of the article attaching device illustrated in FIG. 4, and the measuring device including a stereo camera and a camera mount removed therefrom.

Next, the measuring device 30 and the article attaching device 40 will be further described with reference to FIGS. 4 to 6. FIG. 4 is a perspective view of the measuring device 30 and the article attaching device 40. FIG. 5 is a perspective view of the measuring device 30 from which the protective cover 34 is removed, and the article attaching device 40. FIG. 6 is a perspective view of the article attaching device 40 together with the measuring device 30 including the stereo camera 31 and the camera mount 33 removed therefrom.

The article attaching device 40 includes a holder 41 that holds the measuring device 30 (the camera mount 33 in particular), a base 42 (a fixed portion) secured to the vehicle 20, and a rotator 43 that supports the holder 41 rotatably with respect to the base 42.

The holder 41 includes a frame body 411 and a holding portion 412 fixed to the rear side of the frame body 411. The holding portion 412 holds the stereo camera 31 and the camera mount 33. The holder 41 further includes a bracket 413 and a fall preventing portion 414 including a receiving portion 414*a*.

The base 42 includes a frame body 421 and a holder contact portion 422 that contacts the holder 41 (the frame body 411 in particular).

The rotator 43 includes a bearing 431 fixed to the frame body 411, a bearing 432 fixed to the frame body 421, and a shaft 433 inserted through the bearings 431 and 432. Thus, the holder 41 is supported to be rotatable about the shaft 433 as a rotation axis. The bearing 432 is disposed at a position closer to the front end of the frame body 421 than the center of the frame body 421 in the front-rear direction. This arrangement can secure a relatively long distance (rotation radius) between the shaft 433 (the rotation axis) and the holding portion 412, and secures a movement distance of the holding portion 412 when the holder 41 rotates.

The holder 41 stops rotating upon contacting the holder contact portion 422 of the base 42.

In the present embodiment, the measuring device 30 (the protective cover 34) attached to the article attaching device 40 includes the contact part 345 that contacts the rear hatch door 21 when the rear hatch door 21 is opened. The contact part 345 is preferably made of a slidable material having a good slidability or a rotatable roller. Examples of the slidable material include a polyacetal (POM) and polyamide (PA). The contact part 345 will be described later with reference to FIGS. 11A and 11B.

Figure 7:
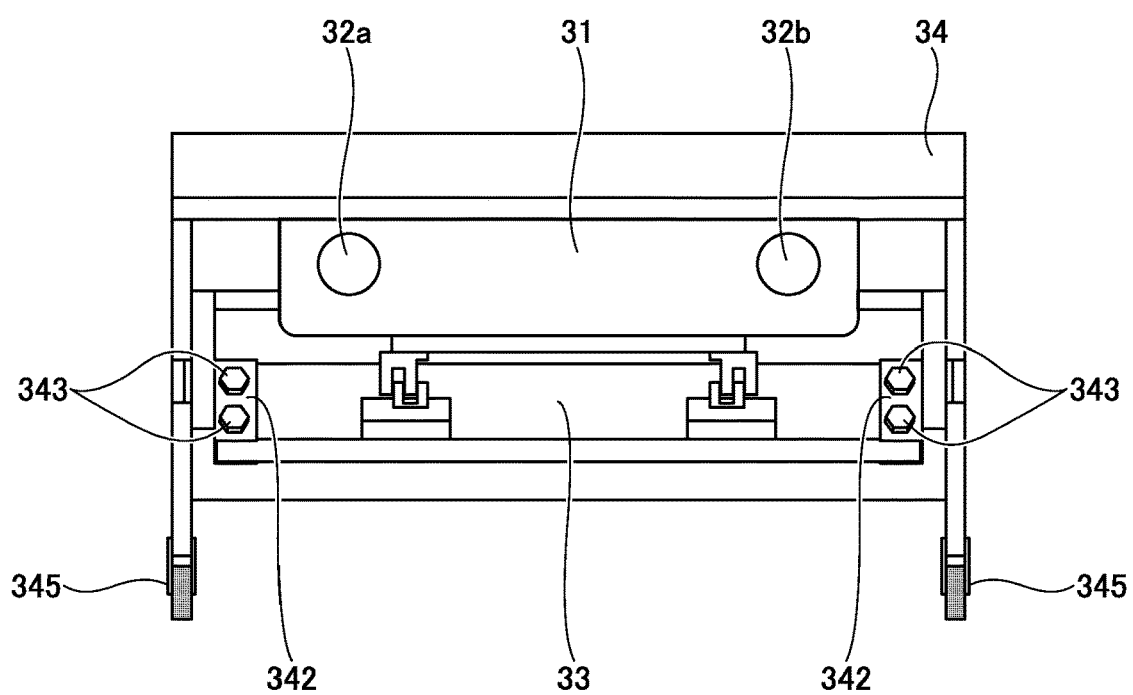
FIG. 7 is a view of the measuring device according to the first embodiment, as viewed from an opening side.

A description is given of attachment and detachment of the protective cover 34 with reference to FIG. 7. FIG. 7 is a view of the measuring device 30 as viewed from the opening side. The bracket 342 is disposed inside the protective cover 34. The bracket 342 is secured to the camera mount 33 with the fastening member 343 such as a bolt. Thus, fastening the camera mount 33 with the protective cover 34 can be performed through the opening 341 of the protective cover 34.

FIGS. 8A, 8B, and 8C are views illustrating the mounting angle of the protective cover 34 of the measuring device 30. As illustrated in FIG. 8A, a first plane SU1 perpendicular to the lower end of the protective cover 34 forms an angle θ with a second plane SU2 parallel to the road surface 100 (see FIG. 1). In other words, the plane of the opening 341 of the protective cover 34 along the first plane SU1 is inclined relative to the direction of gravity. The inclination of the plane of the opening 341 relative to the second plane SU2 perpendicular to the direction of gravity is the angle θ. The plane of the opening 341 is a plane along a rim of the protective cover 34 surrounding the opening 341.

As illustrated in FIG. 8B, the angle θ is preferably larger than 0 degrees. This improves visibility when an operator attaches and detaches the protective cover 34, and the workability improves.

As illustrated in FIG. 8C, the angle θ is preferably smaller than 25 degrees. This structure can prevent light emitted from a light source 200, such as the sun, from entering the protective cover 34 through the opening 341.

That is, the angle θ is more preferably in a range defined as 0°<θ<25°. This structure can secure the visibility when the operator attaches and detaches the protective cover 34 and inhibit light emitted from the light source 200, such as the sun, from entering the inside of the protective cover 34, thereby improving the convenience.

A description is given of attachment and detachment of the stereo camera 31 and the camera mount 33 with reference to FIGS. 9A to FIG. 10B.

Figure 9C:
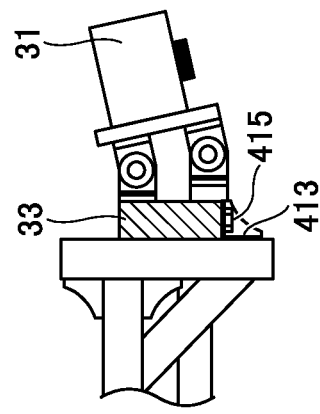
FIG. 9C is a side view illustrating attachment of the camera mount to a holder of the article attaching device according to the first embodiment, with illustration of a fall preventing portion omitted.
Figure 9B:
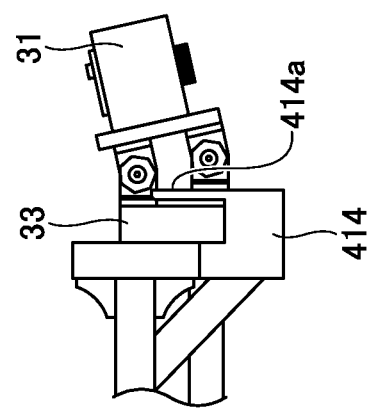
FIG. 9B is a side view of the measuring device and the article attaching device according to the first embodiment.
Figure 9A:
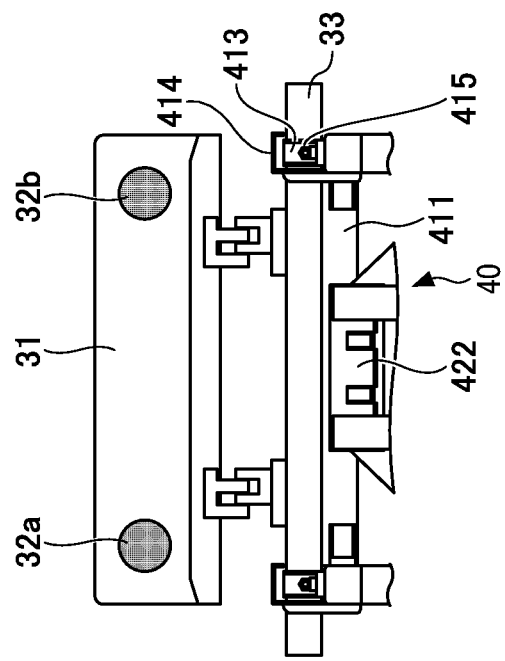
FIG. 9A is a perspective view of the measuring device from which a stereo camera and a camera mount are removed, and the article attaching device according to the first embodiment.

FIG. 9A is a view of the stereo camera 31, the camera mount 33, and the article attaching device 40 as viewed from the bottom, and FIG. 9B is a side view thereof. FIG. 9C is a side view illustrating securing the holder 41 and the camera mount 33 with illustration of the fall preventing portion 414 omitted.

The holding portion 412 (see FIG. 6) is provided with the bracket 413 (an article securing member) and the fall preventing portion 414 (an article supporting portion). The bracket 413 is fixed to the holding portion 412. The camera mount 33 is secured to the bracket 413 by a fastening member 415 such as a bolt from the lower side of the camera mount 33. Thus, the bracket 413 secures the stereo camera 31 and the camera mount 33 as the article, from below, to the article attaching device 40. Thus, fastening the camera mount 33 with the protective cover 34 can be performed through the opening 341 of the protective cover 34.

The fall preventing portion 414 includes the receiving portion 414*a*. This structure can prevent the stereo camera 31 and the camera mount 33 from falling to the rear side due to the own weight of the stereo camera 31. As illustrated in FIG. 9B, the receiving portion 414*a* of the fall preventing portion 414 is positioned on a camera side of the camera mount 33. The camera side here is a portion of the camera mount 33 closer to the stereo camera 31. The receiving portion 414*a* has a shape conforming to a camera side face of the camera mount 33.

Figure 10A:
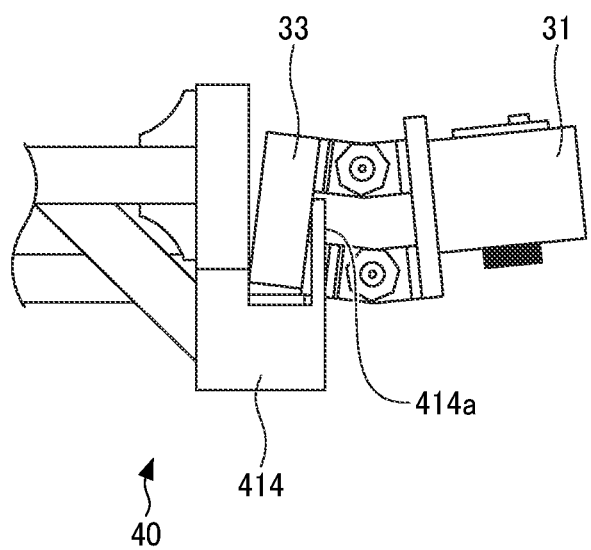
FIG. 10A is a view illustrating attachment of the camera mount according to the first embodiment.
Figure 10B:
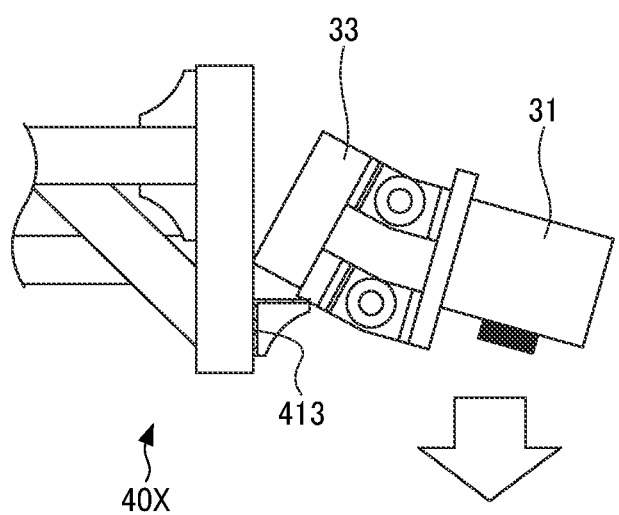
FIG. 10B is another view illustrating attachment of the camera mount according to the first embodiment.

Referring to FIGS. 10A and 10B, descriptions are given below of attachment of the camera mount 33 to the article attaching device 40 according to the first embodiment. FIG. 10A is a side view illustrating attachment of the camera mount 33 to the article attaching device 40 (see also FIG. 6) according to the present embodiment. FIG. 10B is a side view illustrating attachment of the camera mount 33 to an article attaching device 40X according to a comparative example.

Differently from the article attaching device 40 according to the present embodiment, the article attaching device 40X according to the comparative example illustrated in FIG. 10B does not include the fall preventing portion 414. Other configurations are the same as those in the first embodiment, and redundant descriptions are omitted. When the camera mount 33 is attached to the holder 41 of the article attaching device 40X according to the comparative example, the camera mount 33 is placed on the bracket 413 and fixed by the fastening member 415 (see FIG. 9C). There is a risk in a state in which the camera mount 33 is not fastened to the bracket 413 by the fastening member 415 (see FIG. 9C). The stereo camera 31 and the camera mount 33 may fall backward due to the weights thereof and fall onto the ground as indicated by an outlined arrow in FIG. 10B.

On the other hand, the article attaching device 40 of the present embodiment illustrated in FIG. 10A includes the fall preventing portion 414. When the camera mount 33 is attached to the holder 41 of the article attaching device 40 according to the present embodiment, the camera mount 33 is placed on the bracket 413 and fixed by the fastening member 415 (see FIG. 9C). This structure is advantageous in a state in which the camera mount 33 is not fastened to the bracket 413 by the fastening member 415 (see FIG. 9C). Even when the stereo camera 31 and the camera mount 33 tilt backward due to the weights thereof, the receiving portion 414a can support the camera side face (closer to the stereo camera 31) of the camera mount 33, thereby restricting the tilt of the camera mount 33. This structure can prevent the stereo camera 31 and the camera mount 33 from falling onto the ground. This structure can also improve workability in attaching and detaching the camera mount 33 to and from the holder 41.

A description is given of the operation of the article attaching device 40 with reference to FIGS. 11A and 11B. FIGS. 11A and 11B are views illustrating the operation of the article attaching device 40 according to the first embodiment. FIG. 11A is a side view illustrating a state in which the rear hatch door 21 is closed, and FIG. 11B is a side view illustrating a state in which the rear hatch door 21 is open.

As illustrated in FIG. 11A, in a state in which the rear hatch door 21 is closed, the holder 41 that is rotatable about the shaft 433 as the rotation axis receives a clockwise moment due to the weight of the measuring device 30. Further, the holder 41 contacts the holder contact portion 422 (see FIGS. 6 and 9A) of the base 42, and the rotation of the holder 41 is stopped by the holder contact portion 422. Thus, the road surface 100 can be inspected using the measuring device 30.

Figure 12A:
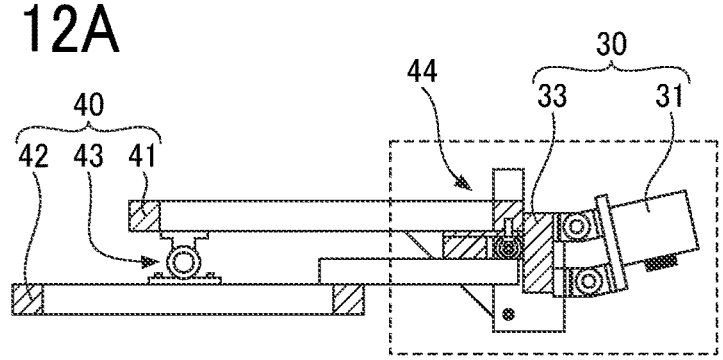
FIG. 12A is a view illustrating an operation of the article attaching device including a rotation stopper according to the first embodiment.
Figure 12B:
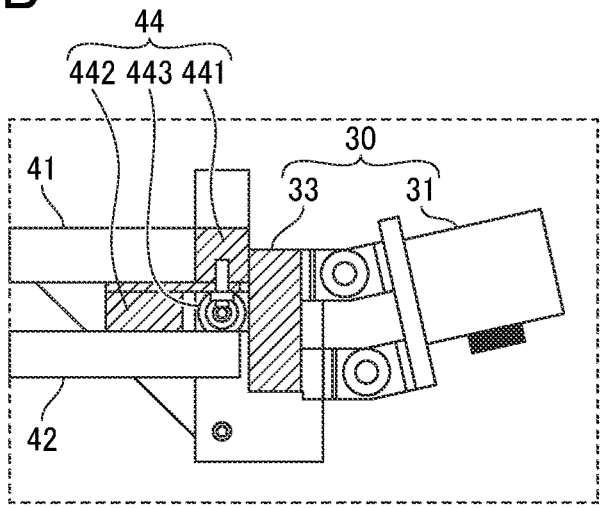
FIG. 12B is an enlarged view of the rotation stopper illustrated in FIG. 12A.
Figure 12C:
FIG. 12C is a perspective view of a detachable member of the rotation stopper illustrated in FIG. 12B.
Figure 12D:
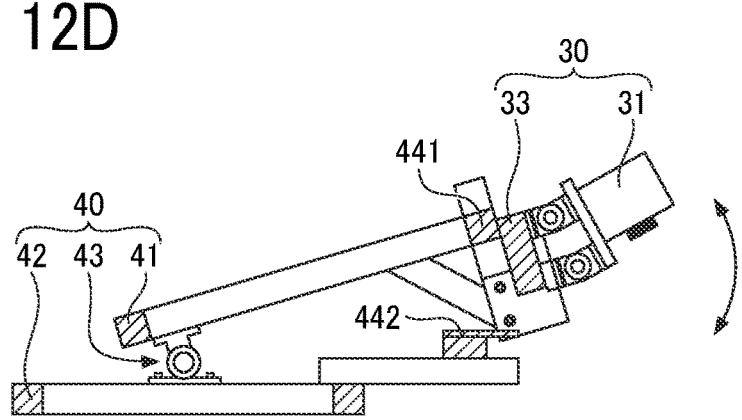
FIG. 12D illustrates a state in which the holder is not secured by the rotation stopper illustrated in FIG. 12B.

The article attaching device 40 may include a rotation stopper 44 that secures the holder 41 at a rotation position where the holder 41 is stopped by the holder contact portion 422. Referring to FIGS. 12A to 12D, a description is given of the operation of the article attaching device 40 and the rotation stopper 44. FIG. 12A is a view illustrating a state in which the position of the holder 41 is fixed (determined) by the rotation stopper 44. FIG. 12B is an enlarged view of the rotation stopper 44. FIG. 12C is a perspective view of a detachable member 443 of the rotation stopper 44. FIG. 12D is a view illustrating a state in which the holder 41 is not secured by the rotation stopper 44, and the holder 41 swings. In FIGS. 12A to 12D, the protective cover 34 is not illustrated for simplicity.

The rotation stopper 44 includes a fixed member 441 fixed to the holder 41, a fixed member 442 fixed to the base 42, and the detachable member 443 detachable from the rotation stopper 44.

The detachable member 443 may be, for example, a bolt as illustrated in FIG. 12C. The detachable member 443 includes a screw portion and an annular gripping portion. The fixed member 441 has, for example, a screw hole into which the screw portion of the detachable member 443 is screwed. The fixed member 442 has, for example, a through hole into which the screw portion of the detachable member 443 is inserted.

As illustrated in FIGS. 12A and 12B, the screw portion of the detachable member 443 is screwed into the through hole of the fixed member 442 to be screwed into the screw hole of the fixed member 441. Thus, the fixed member 441 is engaged with the fixed member 442 by the detachable member 443. That is, the holder 41 is secured to the base 42 by the rotation stopper 44. This structure can prevent the holder 41 from swinging when the vehicle 20 travels. When the detachable member 443 is detached, the holder 41 can swing as illustrated in FIG. 12D.

Figure 13:
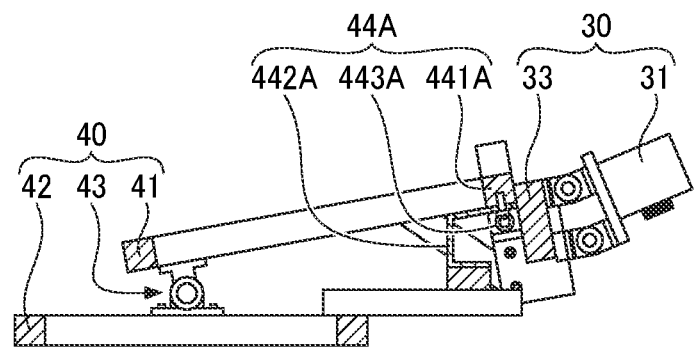
FIG. 13 is a side view illustrating another example of the rotation stopper according to the first embodiment.

FIG. 13 is a diagram illustrating a rotation stopper 44A. The rotation stopper 44A includes a fixed member 441A fixed to the holder 41, a fixed member 442A fixed to the base 42, and a detachable member 443A that is detachable from the rotation stopper 44A. The fixed member 442A has a shape different from that of the fixed member 442 illustrated in FIG. 12B. The rotation stopper 44A illustrated in FIG. 13 can secure the rotation position of the holder 41 such that the angle θ (see FIG. 8A) formed by the first plane SU1 perpendicular to the lower end of the protective cover 34 and the second plane SU2 parallel to the road surface is a given angle in a range of $0°<θ<25°$. Such a configuration can secure visibility when the operator attaches and detaches the protective cover 34 and inhibit light emitted from the light source 200 (e.g., the sun) from entering the inside of the protective cover 34, thereby improving the convenience.

As illustrated in FIG. 11B, when the rear hatch door 21 is opened, the rear hatch door 21 contacts the contact part 345 of the measuring device 30 (the protective cover 34 in particular). As the rear hatch door 21 is further opened, the holder 41 and the measuring device 30 can rotate around the shaft 433, serving as the rotation axis, due to the load on the contact part 345 received from the rear hatch door 21.

Accordingly, in the measuring system 10 (see FIG. 1) in which the article attaching device 40 secures the measuring device 30 to the vehicle 20, the rear hatch door 21 can be easily opened and closed, and convenience can be improved.

The configurations of the measuring device 30 and the article attaching device 40 are not limited thereto. Next, a description is given of the operation of an article attaching device 40A according to a second embodiment, with reference to FIGS. 14A and 14B. FIGS. 14A and 14B are views illustrating the operation of the article attaching devices 40A according to the second embodiment. FIG. 14A is a side view illustrating a state in which the rear hatch door 21 is closed. FIG. 14B is a side view illustrating a state in which the rear hatch door 21 is open.

In the article attaching device 40 according to the first embodiment illustrated in, for example, FIGS. 11A and 11B, the measuring device 30 (the protective cover 34 in particular) includes the contact part 345. By contrast, in the second embodiment, instead of the contact part 345 of the measuring device 30, a contact portion 416 is disposed in the article attaching device 40A. Specifically, the holder 41 of the article attaching device 40A includes the contact portion 416 as illustrated in FIGS. 14A and 14B. Other configurations are the same as those in the first embodiment, and redundant descriptions are omitted. To the article attaching device 40A, a measuring device 30A including the stereo camera 31 and the camera mount 33 is attached. In FIGS. 14A and 14B, the protective cover 34 is not illustrated, but the measuring device 30A preferably includes the protective cover 34. The protective cover 34 of the measuring device 30A can dispense with the contact part 345.

As illustrated in FIG. 14A, in a state in which the rear hatch door 21 is closed, the holder 41 that is rotatable about the shaft 433 as the rotation axis receives a clockwise moment due to the weight of the measuring device 30A. Further, the holder 41 contacts the holder contact portion 422 (see FIGS. 6 and 9A) of the base 42, and the rotation of the holder 41 is stopped by the holder contact portion 422.

As illustrated in FIG. 14B, when the rear hatch door 21 is opened, the rear hatch door 21 contacts the contact portion 416 of the article attaching device 40A (the holder 41 in particular). As the rear hatch door 21 is further opened, the holder 41 and the measuring device 30A can rotate around the shaft 433 as the rotation axis due to the load on the contact portion 416 received from the rear hatch door 21.

Accordingly, in the measuring system 10 (see FIG. 1) including the measuring device 30A attached to the vehicle 20 using the article attaching device 40A, the rear hatch door 21 can be easily opened and closed, and convenience can be improved. In addition, in the article attaching device 40A, the rear hatch door 21 can be easily opened and closed even in a state in which the measuring device 30A is removed, and convenience can be improved.

The present disclosure is not limited to the above-described embodiments of the measuring system 10, and various other embodiments are possible without departing from the spirit and scope of the present disclosure as set forth in the appended claims.

Although the descriptions above concern the measuring system 10 including the vehicle 20 (e.g., an automobile) as the movable body (i.e., the apparatus that moves), the movable body is not limited thereto. The movable body may be, for example, a traveling body that travels on an inspection surface or a drone that flies over the inspection surface.

Although the stereo camera 31 is used as the measuring instrument of the measuring devices 30 and 30A, the measuring instrument is not limited thereto. The measuring instrument may be, for example, a monocular camera, a wide-angle camera, or a LIDAR.

The measuring system 10 has been described as an apparatus that inspects the road surface 100, but the inspection target is not limited thereto. Aspects of the present disclosure can adapt to a configuration for inspecting a side wall of a road, an inner wall (a side wall and a ceiling wall) of a tunnel, or the like.

In addition, the article attaching devices 40 and 40A have been described as devices that attach the measuring device 30 (article) within the operation range of the rear hatch door 21 (movable member) of the vehicle 20 (movable body), the location where the article is attached is not limited thereto. Aspects of the present disclosure can adapt to an article attaching device that attaches an article within an operation range of a movable member of another apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application Nos. 2020-131154, filed on Jul. 31, 2020, and 2021-112323, filed on Jul. 6, 2021, in the Japan Patent Office, the entire disclosure of which is hereby incorporated by reference herein.

REFERENCE SIGNS LIST

10 Measuring system
20 Vehicle (apparatus)
21 Rear hatch door (movable member)
30 Measuring device (article)
31 Stereo camera (imaging device)
33 Camera mount (measuring device mount)
34 Protective cover
40 Article attaching device
41 Holder
42 Fixed portion (base)
43 Rotator
44 Rotation stopper (rotation position fixing member)
411 Frame body
412 Holding portion
413 Bracket (article securing member)
414 Fall preventing portion (article support)
414a Receiving portion (article support portion)
415 Fastening Member (article securing member)
421 Frame body
422 Holder contact portion
431 Bearing
432 Bearing
433 Shaft
341 Opening
342 Bracket
343 Fastening member
345 Contact part
100 Road surface (target)
200 Light source

The invention claimed is:

1. An article attaching device to be attached to an apparatus including a movable object that is movable between a closed position and an open position, the article attaching device comprising:
a holder to hold an article;
a base to be secured to the apparatus including the movable object; and
a rotator to support the holder on the base to rotate in conjunction with a movement of the movable object,
wherein
the article or the holder includes a contact part, the contact part being spaced apart from the movable object in the closed position and being in direct contact with the movable object in the open position,
the contact part includes a slidable material or a rotatable roller, and
the rotator is configured to rotate as the movable object moves between the closed position and the open position.

2. The article attaching device according to claim 1, wherein the holder is disposed in a direction in which the movable object moves and holds the article within a range of movement of the movable object.

3. The article attaching device according to claim 1, wherein the base includes a holder contact portion to contact the holder as the holder rotates in accordance with rotation of the rotator, the holder contact portion being to stop rotation of the holder.

4. The article attaching device according to claim 1, further comprising a rotation stopper to secure the holder at a rotation position within a range of rotation of the holder in accordance with rotation of the rotator.

5. The article attaching device according to claim 4, wherein the base includes a holder contact portion to contact the holder as the holder rotates in accordance with rotation of the rotator, the holder contact portion being to stop rotation of the holder, and
wherein the rotation stopper secures the holder being in contact with the holder contact portion.

6. The article attaching device according to claim 4,
wherein the article includes a measurer to measure a target, and
wherein the rotation stopper is to secure the rotation position of the holder such that an angle θ formed by a first plane and a second plane is in a range of 0°<θ<25°, the first plane being perpendicular to a lower end of the article, the second plane being parallel to the target.

7. The article attaching device according to claim 1,
wherein the holder is to hold the article detachably.

8. The article attaching device according to claim 1,
wherein the holder includes:
a bracket to secure the article from a bottom side of the article to the article attaching device; and
an article support having a shape in conformity with a face of the article, the article support being to prevent the article from falling down.

9. A measuring system comprising:
the article that is a measurer to measure a target;
the article attaching device according to claim 1; and
the apparatus configured to move in operation.

10. The measuring system according to claim 9,
wherein the measurer includes:
an imager to capture an image of the target; and
a cover having an opening, the cover to cover the imaging device.

11. The measuring system according to claim 10,
wherein a plane of the opening of the cover is inclined with respect to the direction of gravity, and
wherein an inclination of the plane of the opening from a plane perpendicular to the direction of gravity is greater than 0 degree and smaller than 25 degrees.

12. The article attaching device according to claim 1, wherein:
the article is a measurer to measure a target,
the apparatus is a vehicle, and
the movable object is a rear hatch of the vehicle.

\* \* \* \* \*